United States Patent
Nelson et al.

(10) Patent No.: US 10,577,120 B1
(45) Date of Patent: Mar. 3, 2020

(54) FLIGHT DISPLAY NETWORK FOR AN AIRCRAFT

(71) Applicant: Rockwell Collins, Inc., Cedar Rapids, IA (US)

(72) Inventors: Brent J. Nelson, Marion, IA (US); Gregory A. Crawford, Marion, IA (US); Darin M. Underwood, Fairfax, IA (US); Daniel R. Nagawiecki, Marion, IA (US); Jessica L. Horaney, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 204 days.

(21) Appl. No.: 15/660,838

(22) Filed: Jul. 26, 2017

(51) Int. Cl.
| | |
|---|---|
| *B64D 43/00* | (2006.01) |
| *H04L 29/08* | (2006.01) |
| *B64D 43/02* | (2006.01) |
| *G08G 5/00* | (2006.01) |

(52) U.S. Cl.
CPC ............ *B64D 43/00* (2013.01); *H04L 67/12* (2013.01); *B64D 43/02* (2013.01); *G08G 5/0086* (2013.01); *G08G 5/0091* (2013.01)

(58) Field of Classification Search
CPC .. G08G 5/0021; G08G 5/0013; G08G 5/0034; G08G 5/0091; G08G 5/0086; H04L 67/12; H04L 2012/4028; H04L 63/105; H04L 63/0428; H04L 69/40; G01C 23/00; G01C 23/005; H04B 7/18508; B64D 43/00; B64D 45/00; B64D 2045/0085; B64D 43/02; G09G 2380/12; G05D 1/0077; G06F 3/147

USPC ............... 701/3, 14, 409; 702/121; 710/15; 713/150; 725/76; 726/4; 345/156, 157,
(Continued)

(56) References Cited

U.S. PATENT DOCUMENTS

| 5,184,312 A * | 2/1993 | Ellis ..................... G05D 1/0077 702/121 |
| 8,219,799 B1 * | 7/2012 | Lucchesi ............... H04L 63/105 713/150 |

(Continued)

OTHER PUBLICATIONS

Microchip, Integrated 4-Port 10/100 Managed Ethernet Switch With Gigabit RGMII/MII/RMII Interface, 2016 Microchip Technology Inc., DS00002134A, 124 pages.

*Primary Examiner* — Jeffrey C Boomer
(74) *Attorney, Agent, or Firm* — Donna P. Suchy; Daniel M. Barbieri (57) ABSTRACT

A flight display system for a cockpit of an aircraft. The flight display system includes a first plurality of flight display units configured to communicate with each other in a daisy chain network. Each of the first plurality of flight display units includes a first physical network interface configured to communicate with one of the first plurality of flight display units, a second physical network interface configured to communicate with another of the first plurality of flight display units, and a flight display circuit. The flight display circuit is configured to receive avionics data via the first physical network interface and determine whether the avionics data is destined for the flight display unit receiving the data. The flight display circuit is configured to send the avionics data to the other flight display unit of the plurality of the first plurality of flight display units via the second physical network interface.

20 Claims, 8 Drawing Sheets

(58) Field of Classification Search
USPC .............. 345/581; 340/5.64, 313, 436, 945; 375/240.12; 370/216, 230
See application file for complete search history.

(56) References Cited

U.S. PATENT DOCUMENTS

| | | | | |
|---|---|---|---|---|
| 8,220,038 | B1* | 7/2012 | Lucchesi | H04L 63/105 726/4 |
| 8,612,639 | B1* | 12/2013 | Righi | G06F 11/143 710/15 |
| 9,100,361 | B1* | 8/2015 | Lucchesi | H04L 63/00 |
| 9,137,038 | B1* | 9/2015 | Mazuk | G06F 11/14 |
| 9,284,045 | B1* | 3/2016 | Springer | G08G 5/003 |
| 9,858,823 | B1* | 1/2018 | Lynn | G08G 5/0034 |
| 9,858,824 | B1* | 1/2018 | Zogg | G08G 5/0034 |
| 2003/0152145 | A1* | 8/2003 | Kawakita | H04N 5/77 375/240.12 |
| 2004/0081079 | A1* | 4/2004 | Forest | H03M 13/43 370/216 |
| 2006/0164261 | A1* | 7/2006 | Stiffler | H04L 67/12 340/945 |
| 2007/0268819 | A1* | 11/2007 | Johansson | G06F 11/004 370/216 |
| 2008/0189748 | A1* | 8/2008 | Bleacher | H04N 7/17318 725/76 |
| 2008/0208399 | A1* | 8/2008 | Pham | G01C 23/00 701/4 |
| 2009/0134981 | A1* | 5/2009 | Shafaat | G08G 5/0008 340/313 |
| 2010/0289671 | A1* | 11/2010 | Hauty | G01D 7/00 340/945 |
| 2012/0112896 | A1* | 5/2012 | Clair | A01B 69/008 340/436 |
| 2013/0038525 | A1* | 2/2013 | Hakegard | G01C 23/00 345/156 |
| 2014/0063037 | A1* | 3/2014 | Danielsson | G08G 5/0021 345/581 |
| 2014/0309820 | A1* | 10/2014 | O'Dell | H04L 67/125 701/3 |
| 2014/0328171 | A1* | 11/2014 | Armbruster | H04L 49/55 370/230 |
| 2014/0336921 | A1* | 11/2014 | Schulte | G01C 23/005 701/409 |
| 2015/0203212 | A1* | 7/2015 | Zubairi | B64D 45/00 701/14 |
| 2015/0360796 | A1* | 12/2015 | Huet | B64D 45/00 340/5.64 |
| 2015/0369626 | A1* | 12/2015 | Dabrowski | G01C 23/00 701/14 |
| 2016/0112151 | A1* | 4/2016 | Chedas | H04J 3/0605 370/503 |
| 2016/0161283 | A1* | 6/2016 | Shamasundar | G06F 3/0481 701/3 |
| 2016/0196752 | A1* | 7/2016 | Ihns | G08G 5/0021 345/157 |
| 2016/0294882 | A1* | 10/2016 | Michaels | H04L 65/1013 |
| 2017/0212604 | A1* | 7/2017 | Bragason | G06F 3/0219 |
| 2018/0007137 | A1* | 1/2018 | Watson | H04W 4/70 |
| 2018/0373404 | A1* | 12/2018 | Sivaratri | G06F 3/0484 |

* cited by examiner

FLIGHT DISPLAY NETWORK FOR AN AIRCRAFT

BACKGROUND

Embodiments of the inventive concepts disclosed herein relate generally to the field of flight displays. More particularly, embodiments of the inventive concepts disclosed herein relate to flight display networks.

A flight display system of an aircraft is a system that receives and provides information to assist the pilot's control of an aircraft. The flight display system may include one or more input devices (e.g., keypads and controllers) and one or more displays. The pilot can take off, land, taxi and otherwise navigate the aircraft using the flight display system. The flight display system may include an attitude indicator (AI) that displays yaw angle, pitch, roll, and orbit of the aircraft. The flight display system may indicate airspeed, ground speed, and altitude. Further, the flight display system may display weather information and/or terrain information determined by a radar system. Based on the terrain and weather information displayed by the weather radar system, a pilot can make navigation decisions for the aircraft.

SUMMARY

In one aspect, the inventive concepts disclosed herein are directed to a flight display system for an aircraft. The flight display system includes first flight display units configured to communicate with each other in a daisy chain network. Each of flight display units include a first physical network interface configured to communicate with one of the first flight display units, a second physical network interface configured to communicate with another of the first flight display units, and a flight display circuit. The flight display circuit of each of the flight display units is configured to receive avionics data via the first physical network interface and determine whether the avionics data is destined for the flight display unit receiving the data. The flight display circuit of each of the flight display units is further configured to send the avionics data to the other flight display unit of the first flight display units via the second physical network interface in response to determining that the avionics data is not destined for the flight display unit receiving the data.

In a further aspect, the inventive concepts disclosed herein are directed to a method for a fault tolerant flight display system for a cockpit of an aircraft. The method includes receiving, by one of first flight display units, avionics data via a first physical network interface of the one of the first flight display units, the first flight display units are configured to communicate with each other in a daisy chain network. The method further includes performing, by the one of the first flight display units, ingress rate limiting by rate limit the received avionics data at a first predefined interval to meet a first data rate, rate limiting the received avionics data includes discarding a portion of the received avionics data. The method further includes determining, by the one of the first flight display units, whether the received avionics data is destined for the flight display unit receiving the data and sending, by the one of the first flight display units, the avionics data to another of the first flight display units via a second physical network interface of the one of the first flight display units in response to determining that the avionics data is not destined for the flight display unit receiving the data.

In a further aspect, the inventive concepts disclosed herein are directed to a fault tolerant flight display system for a cockpit of an aircraft. The fault tolerant flight display system includes a first flight display units configured to communicate with each other in a daisy chain network, each of the first flight display units including a first physical network interface configured to communicate with one of the first flight display units, a second physical network interface configured to communicate with another of the first flight display units, and a flight display circuit. The flight display circuit of each of the flight display units is configured to receive avionics data via the first physical network interface and perform ingress rate limiting by rate limit the received avionics data at a first predefined interval to meet a first data rate. Rate limiting the received avionics data includes discarding a portion of the received avionics data. The flight display circuit of each of the flight display units is configured to determine whether the avionics data is destined for the flight display unit receiving the data. The flight display circuit of each of the flight display units is further configured to send the avionics data to the other of the first flight display units via the second physical network interface in response to determining that the avionics data is not destined for the flight display unit receiving the data. Sending the avionics data to the other flight display unit of the first flight display units includes performing egress rate limiting by sending the avionics data at a second predefined interval to meet a second data rate.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Before describing in detail the inventive concepts disclosed herein, it should be observed that the inventive concepts disclosed herein include, but are not limited to, a novel structural combination of data/signal processing components, sensors, and/or communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

Referring generally to the FIGURES, systems and methods for a network of flight display units is shown according to various aspects of the inventive concepts. The network of flight display units described herein may be a daisy chain network of flight display units in a cockpit of an aircraft. The flight display units may communicate among each other via the daisy chain network. In some cockpits, there may be two separate flight display networks of flight display units, one for the right side of the cockpit and one for the left side of the cockpit.

The network of flight display units described herein may be a fault tolerant and/or isolated network that is extendable i.e., any number (e.g., 1-8 or more) of the flight display units can be added to the network without using up a large number of network ports since the devices may be connected in a daisy chain. For example, the flight display units may communicate to an avionics platform. The avionics platform may have a finite amount of network ports that is less than the number of flight displays that are necessary to be connected to the avionics platform. In this regard, network resources, i.e., network connections, can be conserved by daisy chaining the flight display units off of the avionics platforms.

Further, the flight display units and the avionics platforms may be fault tolerant since the functionality of the flight display units and the avionics platforms may be critical for the safety of an aircraft. The flight display units can continue to function if one of the flight display units encounters a failure. The flight display units of the network can be configured to perform ingress and egress rate limiting in order to be fault tolerant. In this respect, if one of the units in the network begins to "babble" or otherwise begin to transmit data in an unreliable manner, the ingress rate limiting of the display units in the network can discard excess data transmissions to ensure that a single faulty display units does not take up the totality of the bandwidth of the flight display network. The egress rate limiting can cause flight display units to transmit data at a predefined rate in order to maintain transmission rate standards and not use up all available network bandwidth.

While the aircraft that includes the flight display network is airborne, the functionality of the flight display network is critical to the safety of the aircraft. In this regard, when the aircraft is airborne, the flight display units can be configured to perform ingress and egress rate limiting of data. However, when the aircraft is not airborne, i.e., when the aircraft has weight on its wheels, the flight display units can be configured to disable ingress and egress data limiting. There may be a switch in the cockpit that is a "Dataload Enable" switch. A pilot of the aircraft may indicate via the switch that the ingress and egress data limiting should be disabled. Further, the flight display network can disable the ingress and egress data limiting in response to sensors indicating that the aircraft is on the ground. By using both the "Dataload Enable" switch and sensors of the aircraft that indicate that the aircraft is on the ground, the flight display network may not have a single point of failure. For example, if either the "Dataload Enable" switch or a landing gear sensor breaks, ingress and egress limiting will not automatically be disabled. This also prevents the ingress and egress limiting from being automatically switched on or off whenever the aircraft takes off or lands i.e., when the sensors indicate that the aircraft has taken off or landed.

In this regard, any type of data loading that takes place in the flight display network when the aircraft is on the ground will be able to utilize the maximum amount of bandwidth available in the flight display network. Disabling and enabling ingress and egress rate allows for secure network communication in critical situations and quick network communication in non-critical situations.

Figure 1:
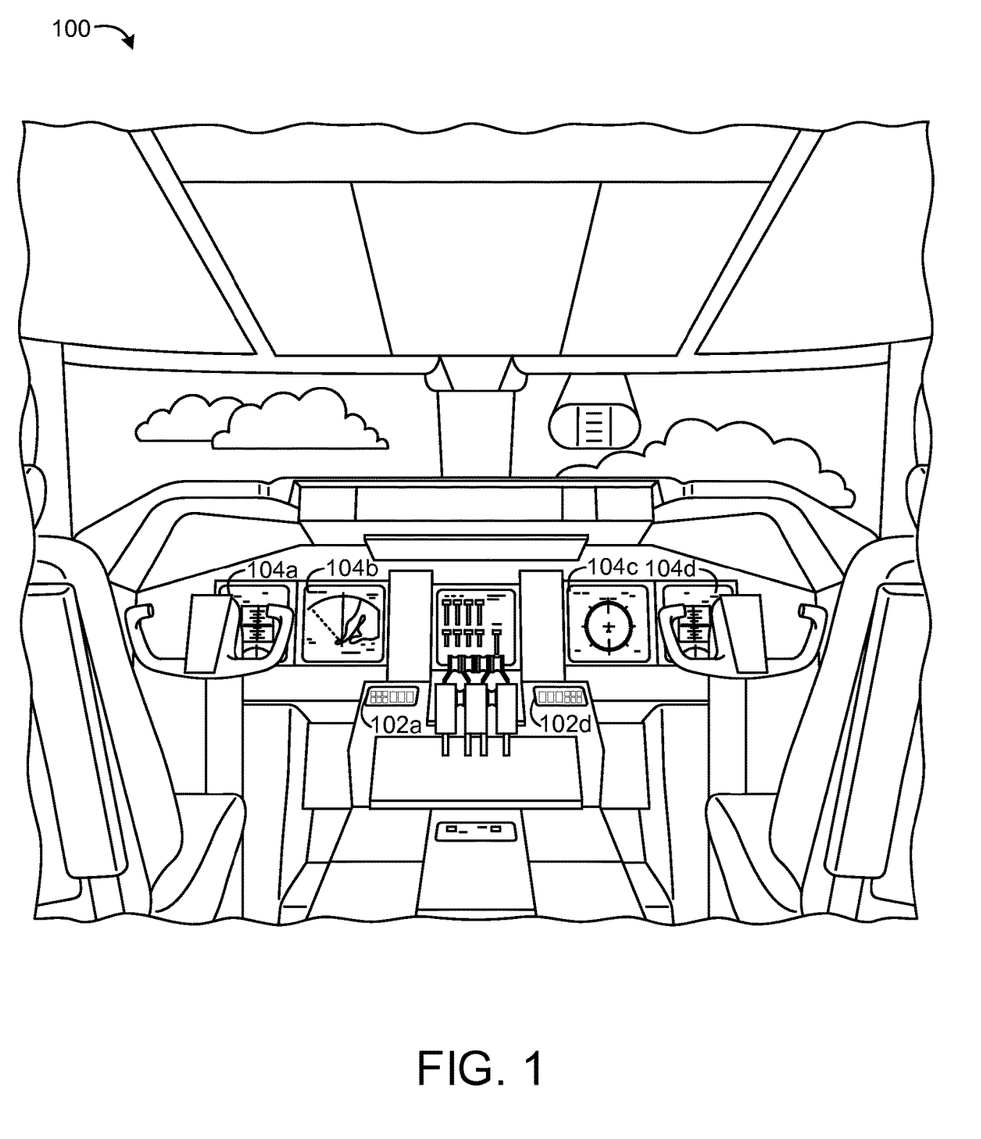
FIG. 1 is a perspective view schematic drawing of a cockpit of an aircraft with flight display units and avionics units according to exemplary aspects of the inventive concepts disclosed herein.

Referring now to FIG. 1, a cockpit of an aircraft is shown including flight display units and avionics units that can be configured to communicate via a flight display network as described herein, according to an exemplary embodiment. Cockpit 100 may be a cockpit of an aircraft. The aircraft of the cockpit 100 may be any kind of commercial aircraft, military aircraft, helicopter, unmanned aerial vehicle (UAV), spacecraft, and/or any other kind of vehicle, manned or unmanned.

The cockpit 100 is shown to include flight display units 102*a* and 102*d*. The cockpit 100 can include any number of flight display units. The flight display units 102*a-e* may be touch screen interfaces for a pilot (e.g., interfaces for a primary flight display, a weather radar displays, a terrain display, etc.). A pilot and/or copilot may utilize the flight display units 102*a-e* when flying the aircraft. The flight display units 102*a-e* may be controllers that include one or more physical buttons and/or one or more display screens. In some embodiments, the screens are touch screens. In this regard, a pilot can interact with the flight display units 102*a-e* via touch and/or physical buttons. The flight display units 102*a-e* may be touch screen controllers (TSCs).

The cockpit 100 is shown to include avionics units 104*a-d*. Avionics units 104*a-d* may include display screens (e.g., screens similar to user interface 402 as described with reference to FIG. 1) e.g., the display screens shown in FIG. 1. The avionics units 104*a-c* may be avionics devices or systems of the aircraft for the cockpit 100. In some embodiments, the avionics units 104*a-c* are radios (e.g., very high frequency (VHF) radios, satellite communication (SATCOM) radio systems, high frequency (HF) data radio systems, etc.), a global positioning system (GPS), a terrain radar system, a weather radar system, an altimeter system, a flight display system (ADS), etc. The avionics units 104*a-c* may include various computing platforms for controlling, flying, or displaying information pertaining to the aircraft. The computing platforms can receive information pertaining to the status of the aircraft via sensors and/or antenna systems and/or information input via the flight display units 102*a* and 102*d*.

Figure 2:
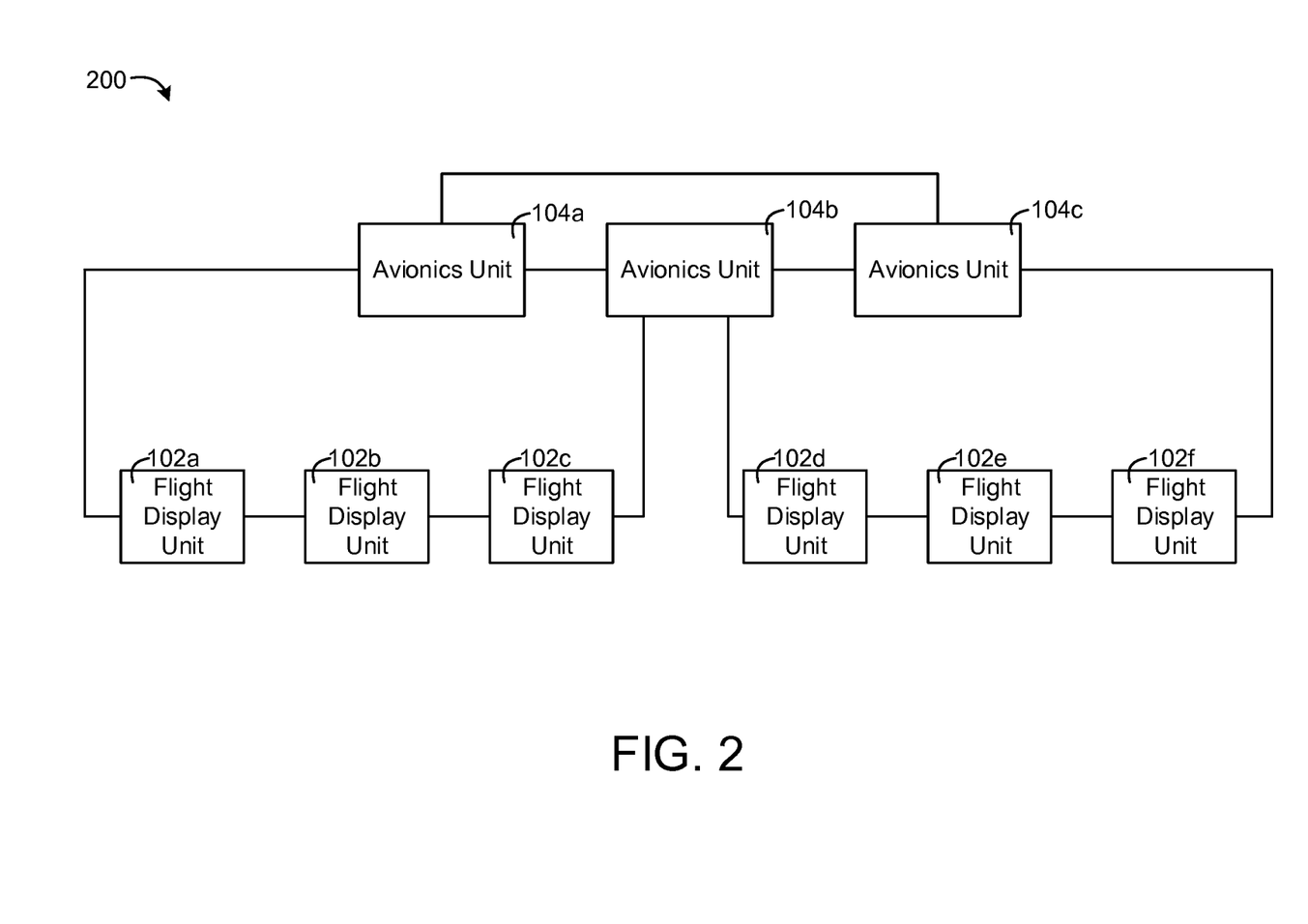
FIG. 2 is a block diagram of the flight display units and the avionics units of FIG. 1 according to an exemplary aspect of the inventive concepts disclosed herein.

Referring now to FIG. 2, a network 200 of the flight display units 102a-f communicating to the avionics units 104a-c. The avionics units 104a-c may transmit avionics data to the flight display units 102a-f and may receive data from the flight display units 102a-f. The data that the flight display units 102a-f receives from the avionics units 104a-104c may be used by the flight display units 102a-f to display information to a pilot (e.g., an attitude indicator (AI), yaw angle, pitch, roll, orbit, airspeed, ground speed, terrain radar, weather radar, altitude, flight information, etc.).

The network 200 may be an Ethernet network, an ARINC 664 network, or any other type of network. Network 200 may be a daisy chain network. Via the daisy chain topology of the network 200, the flight display units 102a-c can communicate among each other. Further, the flight display units 102a-c can communicate with the avionics unit 104a-c. The flight display units 102a-c may be and/or avionics unit 104a flight display units for one side (e.g., the right side) of the cockpit 100. Similarly, the flight display units 102d-f can be configured to communicate via the daisy chain network among each other and the avionics units 104a-c. The flight display units 102d-f may be flight display units for a second side of the cockpit 100 (e.g., the right side).

In FIG. 2, the avionics units 104a-104c are shown to perform point to point communication (e.g., point to point Ethernet). The flight display units 102a-c and 102d-f are daisy chained off of the avionics units 104a-c. The flight display units 102a-c and 102d-f may be slaved off of the avionics units 104a-c. Daisy chaining the flight display units 102a-c and 102d-f may provide scalability to add new flight display units without requiring an additional Ethernet port on the avionics units 104a-c.

Figure 3A:
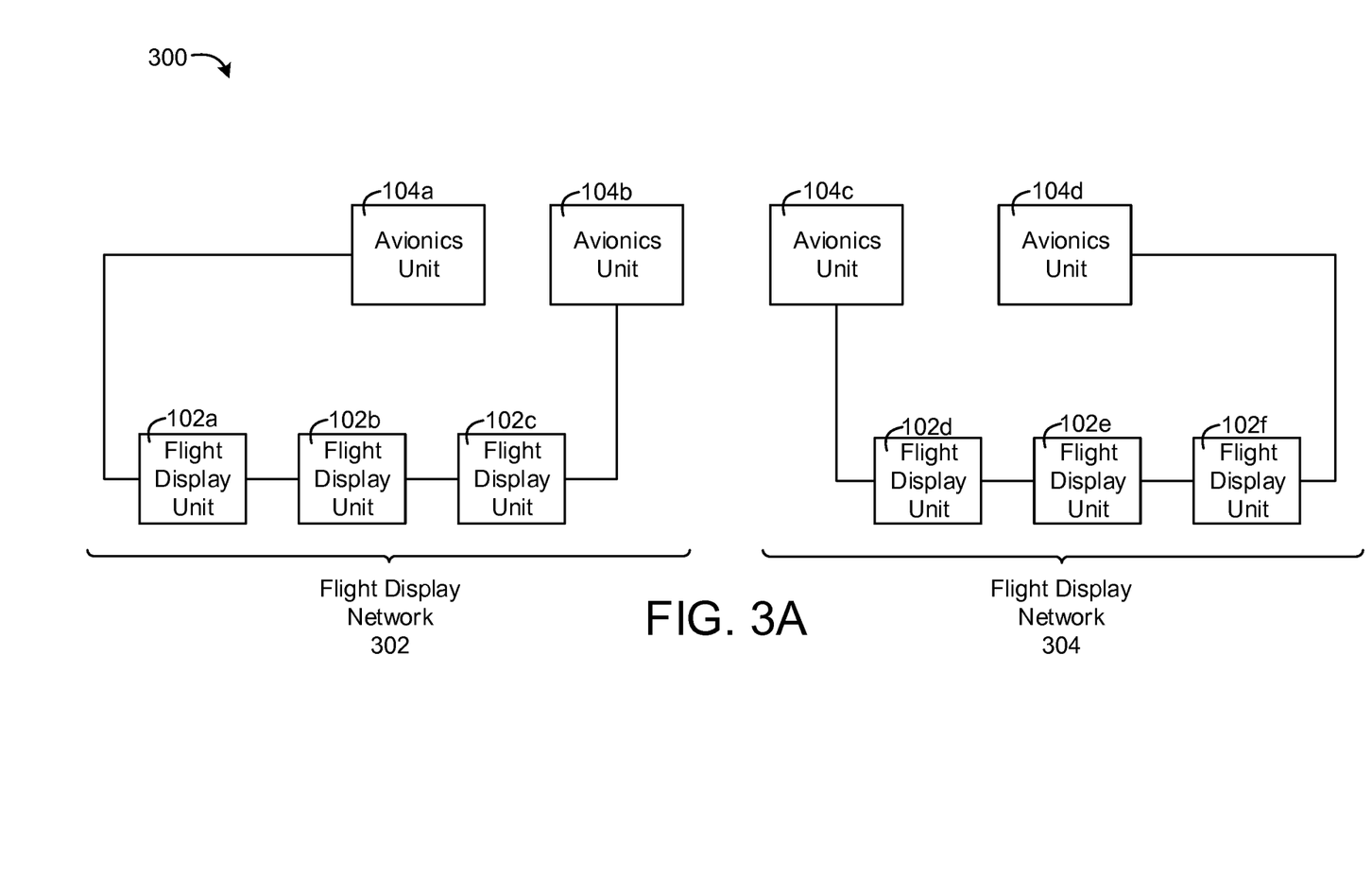
FIG. 3A is a block diagram of the flight display units and the avionics units of FIG. 1 communicating via two daisy chain networks according to an exemplary aspect of the inventive concepts disclosed herein.

Referring now to FIG. 3A, a system of two daisy chain networks of flight display units for an aircraft is shown according to an exemplary embodiment. In FIG. 3A, system 300 is shown to include two networks. The system 300 is divided into a flight display network 302 and a flight display network 304. The flight display network 302 may be a flight display network for one side of the cockpit 100 while the flight display network 304 may be a flight display network for a second side of the cockpit 100. For example, the flight display network 302 may be a network of flight display units (e.g., the flight display units 102a-c) and/or avionics units (e.g., avionics units 104a-b) for the left side of the cockpit 100 while flight display network 304 may be a network of flight display units (e.g., flight display units 102d-f) and/or avionics units (e.g., avionics units 104c-d) for the right side of the cockpit 100. In this regard, the flight display network 302 and the flight display network 304 are not dependent on each other. As an example, if the flight display network 304 were to crash or otherwise become unreliable, the flight display network 302 would continue to function. The flight display units 102c and 102f may be the same and/or similar to the flight display units 102a-b and the flight display units 102d-e.

Flight display networks 302 and 304 may be daisy chain networks. The daisy chain networks may be Ethernet, ARINC 664 (e.g., Avionics Full-Duplex Switched Ethernet (AFDX)), or any other network. The daisy chain networks can be either linear or a ring network (linear networks shown in FIG. 3A). Further the daisy chain network communication can be either unidirectional or bidirectional. In this regard, when flight display networks 302 and 304 perform bidirectional communication, if one of the devices of one of flight display networks 302 and 304 go offline, the online devices can continue to communicate.

Figure 3B:
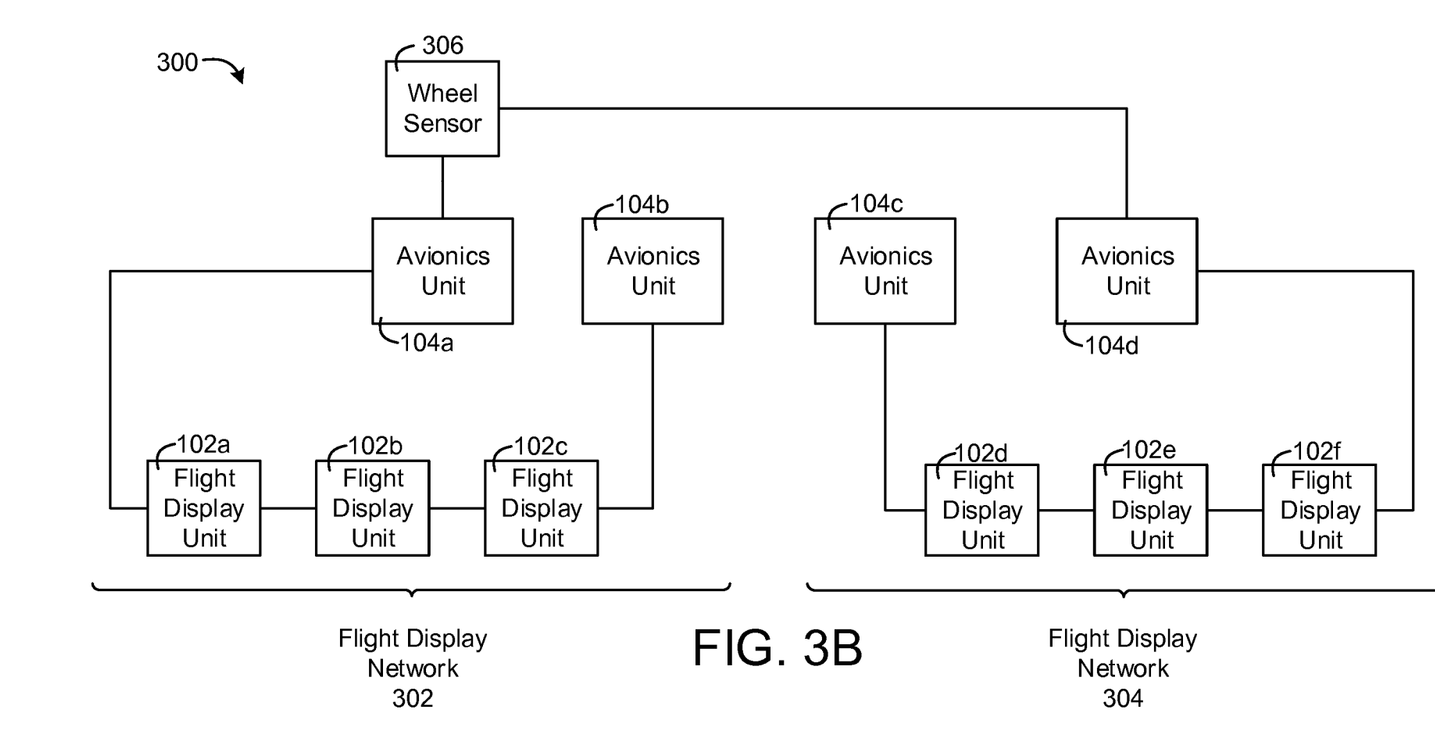
FIG. 3B is a block diagram of the flight display units and the avionics units of FIG. 1 and a wheel sensor communicating via two daisy chain networks according to an exemplary aspect of the inventive concepts disclosed herein.

Referring now to FIG. 3B, the system 300 of FIG. 3A is shown to include a wheel sensor 306 according to an exemplary embodiment. The wheel sensor 306 may be one or more proximity sensors, mechanical switches, and/or any other type of sensor for a wheel of an aircraft. The wheel sensor 306 may be located on a wheel of an aircraft, a strut supporting the wheel, or inside the aircraft. The wheel sensor 306 can be configured to determine when the aircraft has weight on its wheels. The wheel sensor 306 may communicate to a system with an indication that the aircraft is on the ground i.e., that the aircraft has weight on its wheels.

In FIG. 3B, the avionics unit 104a and the avionics unit 104d are shown to be in communication with the wheel sensor 306. The avionics unit 104a and/or the avionics unit 104d can be in direct communication with the wheel sensor 306 and/or a system that includes the wheel sensor 306. Based on an indication that the aircraft has weight on its wheels as received from the wheel sensor 306, the avionics unit 104a and/or 104d can disable ingress and egress rate limiting that they may perform. Further, the avionics unit 104a may send avionics data that indicates and/or includes an indication that the aircraft has weight on its wheels to some and/or all of the devices of the flight display network 302. Likewise, the avionics unit 104d may send the same indication to the devices of the flight display network 304. In some embodiments, the avionics data which indicates weight on wheels is only sent if a "safe to load" setting is active. A pilot may set the "safe to load" setting (e.g., set the setting via on of the flight display units 102a-f which may then communicate the safe to load setting the devices of flight display networks 302 and/or 304) or otherwise the safe to load setting may be automatically enabled by an avionics system. The "safe to load" setting may be input by the pilot via a "Dataload Enable" switch and/or via an interface of the flight display units 102a-f.

Each of the devices of flight display networks 302 and 304 can be configured to determine, based on the received avionics data, that the aircraft has weight on its wheels. For this reason, each of the devices can be configured to disable ingress and/or egress rate limiting. This may enable an aircraft that is located on the ground to perform data loading without ingress and/or egress rate limiting (as fast as possible). Since the aircraft is on the ground, any malfunctions in communication that could have been prevented by the egress and ingress rate limiting do not jeopardize the safety of the aircraft.

When the wheel sensor 306 indicates that the aircraft has taken off, the avionics unit 104a and/or the avionics unit 104d can be configured to send avionics data to the devices of flight display networks 302 and 304 that indicates that the aircraft is airborne. In response to receiving the avionics data, the devices of flight display networks 302 and 304 can enable ingress and egress rate limiting.

Figure 4:
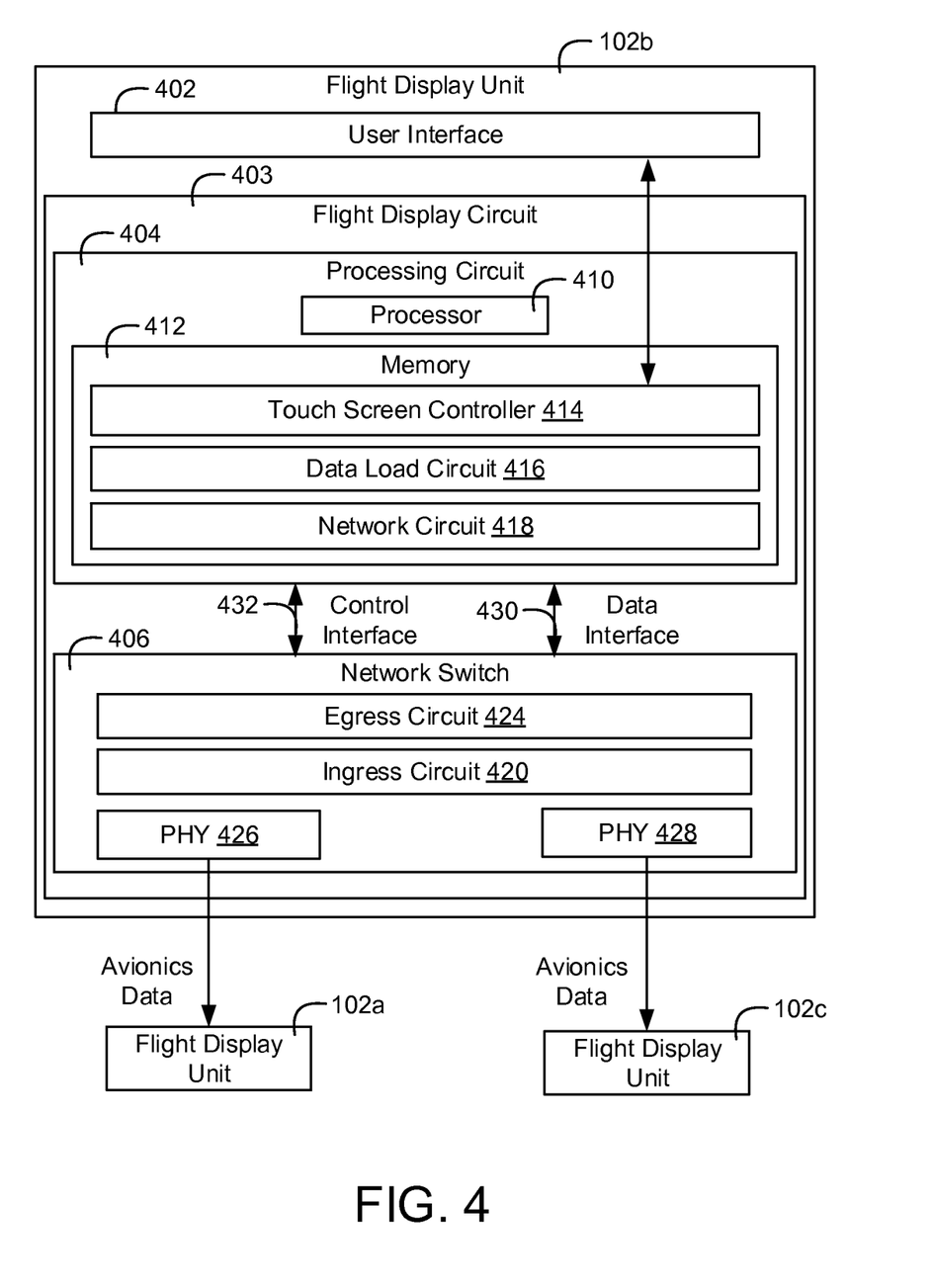
FIG. 4 is a block diagram of one of the plurality of flight display units of FIG. 1 in greater detail according to an exemplary aspect of the inventive concepts disclosed herein.

Referring now to FIG. 4, a flight display unit 102b is shown in greater detail, according to an exemplary embodiment. The flight display 102b is shown to be connected in the flight display network 302 i.e., the flight display unit 102b is shown to be connected to the flight display unit 102a and the flight display unit 102c. Although FIG. 4 shows the flight display unit 102b in greater detail, it should be understood that the description of the flight display unit 102b can be applied to the flight display unit 102a, the flight display units 102c-f, and/or avionics units 104a-d.

The flight display unit 102b is shown to include a user interface 402. The user interface 402 may be a touch screen display e.g., a resistive touch screen, a capacitive touch screen, an LED display, a CRT display, and/or any other display or touch screen. The user interface 402 may include one or more buttons, keypads, switches, levers or other physical input devices. A flight display circuit 403 of flight display unit 102b can be configured to generate images, text, or characters to display on the user interface 402. Further, the flight display unit 102b may receive pilot inputs from the user interface 402 and/or buttons, switches or other physical input associated with the user interface 402.

The flight display circuit 403 is shown to include a processing circuit 404 and a network switch 406. Via the processing circuit 404 and/or the network switch 406, the flight display circuit 403 can be configured to control the user interface 402 and facilitate communication with the flight display network 302 e.g., the flight display unit 102a, and the flight display unit 102c.

The processing circuit 404 can be configured to configure and/or control the network switch 406 and/or the user interface 402. The processing circuit can communicate to network switch 406 via control interface 432 and data interface 430. Data interface 430 may be a physical interface (e.g., one or more electrical connections) for receiving and/or transmitting avionics data. For example, any avionics data that the network switch 406 receives that may be destined for flight display circuit 403 may be sent to processing circuit 404 via data interface 430. Control interface 432 may be electrical connections by which processing circuit 404 configures and/or controls network switch 406.

The processing circuit 404 is shown to include a processor 410 and memory 412. The processing circuit 404 may include at least one processor 410, which may be any type of general purpose or special purpose processor (e.g., FPGA, CPLD, ASIC). The processing circuit 404 also includes at least one memory 412, which may be any type of non-transitory computer or machine-readable storage medium (e.g., ROM, RAM, hard disk, flash memory).

The memory 412 is shown to include a touch screen controller 414, a data load circuit 416, and a network circuit 418. The touch screen controller 414 can be configured to control the user interface 402. The touch screen controller 414 can be configured to cause the user interface 402 to display images, text, symbols, etc. The touch screen controller 414 can be configured to perform graphics processing. The touch screen controller 414 can be configured to receive input from a pilot via the flight display circuit 403.

The data load circuit 416 can be configured to determine that the aircraft of the flight display unit 102b is located on the ground (it has weight on its wheels) and can cause the network switch 406 to disable an egress circuit 424 and an ingress circuit 420 of network switch 406. Avionics data received from the flight display unit 102a and/or the flight display unit 102c may indicate weight on the wheels of the aircraft. For example, the avionics unit 104a and/or the avionics unit 104b may include one or more sensors that determine whether the aircraft has weight on its wheels. In response to determining that the aircraft has weight on its wheels, the avionics unit may transmit a message that indicates that the aircraft has weight on its wheels. The data load circuit 416 can be configured to determine, based on avionics data received from the avionics unit that the aircraft has weight on its wheels and in response can disable the egress circuit 424 and/or the ingress circuit 420. In some embodiments, the network switch 406 includes various priority queues that data load circuit 416 can be configured to control. Data for data loading may be stored in the priority queues at different priority levels (e.g., higher for faster data loading).

The network circuit 418 can be configured to control the state and configuration and/or monitor the network switch 406. In some embodiments, the network circuit 418 receives and/or stores a network configuration table (NCT) that it uses to configure the network switch 406. The network circuit 418 can be configured to transmit avionics data received from the user interface 402 (e.g., a control input from a pilot) to another display unit or avionics unit of the flight display network 302 via networks switch 406. Further, the network circuit 418 can be configured to cause the network switch 406 to send avionics data it receives from the flight display unit 102a to the flight display unit 102c and vice versa, i.e., from the flight display unit 102c to the flight display unit 102a.

For example, the avionics data that the network switch 406 receives from the flight display unit 102a may be destined for the flight display unit 102b. In this regard, the network circuit 418 may provide the avionics data it receives to the touch screen controller 414 or another component of flight display unit 102. However, the network circuit 418 may determine that the avionics data it receives from the flight display unit 102a is destined for another flight display unit in the flight display network 302 e.g., the flight display unit 102c or the avionics unit 104b. In this regard, the network circuit 418 can cause the network switch 406 to provide the avionics data to the flight display unit 102c. Network circuit 418 can be a component of memory 412 and/or network switch 406.

The network switch 406 may be a network switch for Ethernet and/or any other type of network. The network switch 406 can be an integrated circuit e.g., the Micrel Ethernet switch KSZ8794CNX. In various embodiments, the network switch 406 is a virtual Ethernet switch and is part of the memory 412. The network switch 406 is shown to include the egress circuit 424 and the ingress circuit 420. Further, the network switch 406 is shown to include a physical interface (PHY) 426 and a PHY 428. The network switch 406 can be configured to perform hardware switching of avionics data. The network switch 406 can be configured to transmit avionics data it receives via the PHY 426 to the flight display unit 102c via the PHY 428 if the avionics data is destined for the flight display unit 102c or another flight display unit or avionics unit part of flight display network 302. Further, if the avionics data is destined for the flight display unit 102b, the network switch 406 can provide the avionics data it receives via the PHY 426 and/or the PHY 428 to the processing circuit 404 via the data interface 430. Network switch 406 may determine the destinations for the avionics data based on addresses included in the avionics data.

The ingress circuit 420 can perform ingress data limiting of avionics data received via the PHY 426 and/or the PHY 428. The ingress circuit 420 can be configured to discard certain amounts of received avionics data. For example, the ingress circuit 420 may maintain a predetermined data rate of received data and can discard packets of avionics data to maintain the predetermined data rate. If the rate at which data is being received exceeds a predefined rate, the ingress circuit 420 can be configured to discard a particular amount of the received data to meet the predetermined rate.

The egress circuit 424 can perform egress data limiting of avionics data to be transmitted via the PHY 426 and/or the PHY 428. Egress circuit 424 can be configured to perform traffic shaping. The egress circuit 424 can be configured to not send certain amounts data (e.g., delay the data) that the network switch 406 is configured to send (e.g., avionics data received that is being sent to another flight display unit or avionics data that the flight display unit 102b determines to transmit) in order to transmit data at a predefined rate. Further, the egress circuit 424 may maintain a predetermined data transmission rate by discarding some packets of avionics data it is configured to transmit.

The flight display circuit 403 (or components of the flight display circuit 403 e.g., the processing circuit 404 and/or the network switch 406) can be configured to perform integrity checks on received avionics data. Each piece of avionics data (e.g., frame of Ethernet data) transmitted within flight display networks 302 and 304 can include a cyclic redundancy check (CRC) frame (e.g., CRC32). The CRC frame may be any number of bits that can be utilized to verify the integrity of the avionics data. Any potential concerns regarding bit level integrity of the avionics data being routed through flight display networks 302 and 304 can be resolved via CRC. Further, if the avionics data includes transport layer data (e.g., TCP, UDP, SCTP), transport layer checksums can be used by the flight display circuit 403 to verify the integrity of any received avionics data. This may be used to maintain data integrity in addition to the CRC checksum.

Figure 5:
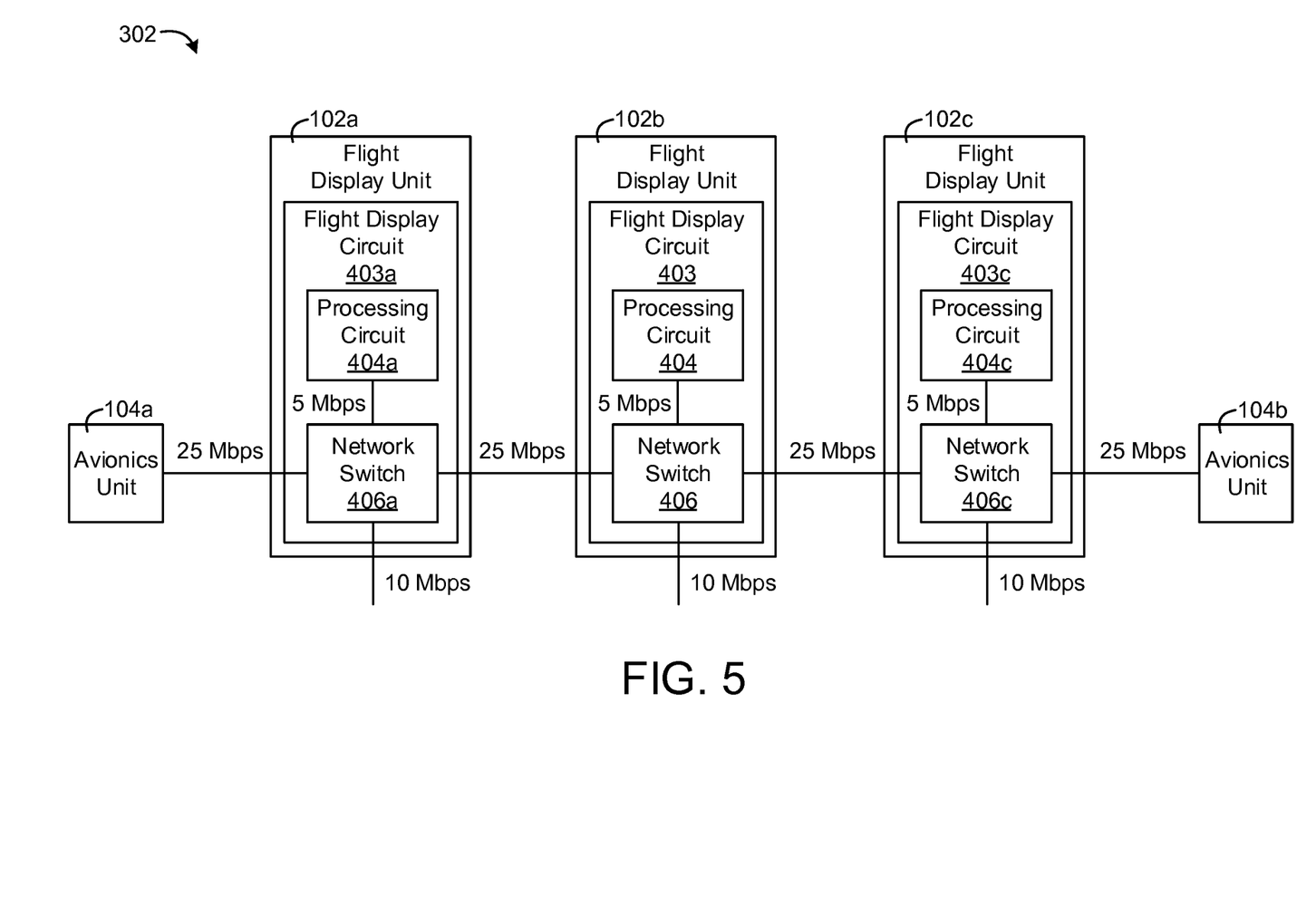
FIG. 5 is a block diagram of the flight display units of FIG. 1 performing ingress and egress rate limiting according to an exemplary aspect of the inventive concepts disclosed herein.

Referring now to FIG. 5, a block diagram of the devices of the flight display network 302 are shown to illustrate rate limiting and bandwidth allocation, according to some embodiments. It should be understood that the description of the flight display network 302 of FIG. 5 can be applied to the flight display network 304 as described with reference to FIG. 3A. FIG. 5 illustrates rate limiting that the devices of flight display network 302 can be configured to perform. Although the egress circuits (e.g., egress circuit 424) and the ingress circuits (e.g., ingress circuit 420) are not shown in FIG. 5, it should be understood that the ingress and egress rate limiting discussed with reference to FIG. 5 can be performed via egress circuits (e.g., egress circuit 424) and ingress circuits (e.g., ingress circuit 420).

The flight display unit 102a and the flight display unit 102c may be the same and/or similar to the flight display unit 102b. For example, a flight display circuit 403a and a flight display circuit 403c may be the same and/or similar to the flight display circuit 403. Further, processing circuit 404a and processing circuit 404c may be the same and/or similar to the processing circuit 404 while a network switch 406a and a network switch 406c may be the same and/or similar to the network switch 406.

The bandwidth allocation performed by network switches 406, 406a, and 406c is illustrated in FIG. 5. The bandwidth allocation can be facilitated via ingress and egress rate limiting performed by the network switch 406, the network switch 406a, the network switch 406c, and/or avionics units 104a-b. All communication between one of the network switches (e.g., the network switch 406a and the network switch 406c) and an avionics unit (e.g., the avionics unit 104a and the avionics unit 104b) can be maintained at a first rate (e.g., 25 Mbps). Communication between one of the Ethernet switches shown in FIG. 5 and one of the processing circuits shown in FIG. 5 may be lower than the first rate. The second rate may be 5 Mbps. Further, communication between network switches may be at the first rate (e.g., 25 Mbps). Having the ingress rate be higher than the egress rate may cause the flight display networks 302 and 304 to be fault tolerant.

Since the avionics data transmitted by the avionics units 104a-b may be ARINC 661, aircraft in/out, and avionics application data, the bandwidth allocated to this data may be high i.e., higher than the bandwidth between a network switch and a processing circuit (e.g., it may be 25 Mbps). The bandwidth allocated for communication between the Ethernet switch and the processing circuit may be lower i.e., at a second bandwidth level (e.g., 5 Mbps), since this data may only be for ARINC 661 graphics server outputs and low level rate control data for the Ethernet switch. Ethernet switches 408a, 408, and 408c are shown to include a third PHY. This PHY has a third bandwidth allocation level e.g., 10 Mbps. This may be allocated for an addition unit (e.g., a data concentrator unit (DCU)) that can be connected to the flight display unit 102a, 102b, and/or 102c.

The ingress and egress rate limiting that the network switches of the flight display network 302 may perform may be performed at a particular interval. This may be the interval at which traffic rates are being checked and/or data being discarded. In some cases, the particular interval is a second. For some network switches, the period is 16 milliseconds, 64 milliseconds, or 256 milliseconds. It may be desirable that the interval is between 10 to 25 milliseconds. 16 milliseconds may be desirable. The Ethernet thread of the units in the flight display network 302 (e.g., the avionics units 104a-b) may be 100 Hz (i.e., 10 milliseconds). The interval at which the network switch 406 performs ingress and/or egress rate limiting may be set by the network circuit 418. The bounds of latency for the flight display units (e.g., the flight display unit 102b) may be the period over which the rate limiting is performed by the Ethernet switch of the flight display unit.

Figure 6:
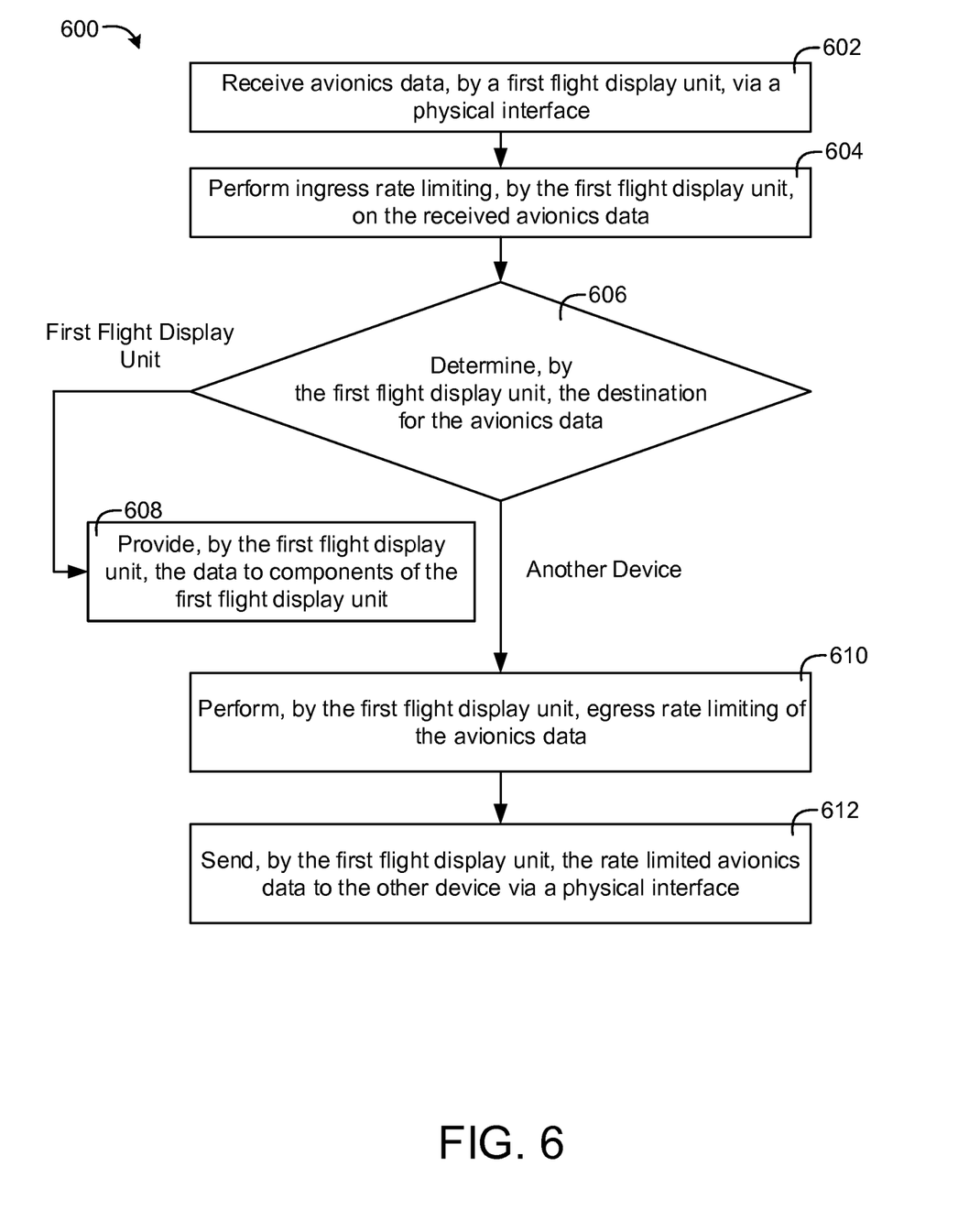
FIG. 6 is a flow diagram of a process that can be performed by the flight display units of FIG. 1 for communicating in a daisy chain network according to an exemplary aspect of the inventive concepts disclosed herein.

Referring now to FIG. 6, a process 600 that can be performed by one of the flight display units of FIG. 3A is shown, according to an exemplary embodiment. The flight display unit 102b can be configured to perform process 600. Process 600 is described with reference to a first flight display unit, the flight display unit 102b. The other device referenced in FIG. 6 may be the avionics unit 104a-d, the flight display unit 102a, the flight display unit 102c, and/or the flight display unit 102d-f. Further, the avionics unit 104a-d, the flight display unit 102a, the flight display unit 102c, and/or the flight display unit 102d-f can be configured to perform process 600. Although FIG. 6 and process 600 are described with reference to the flight display unit 102b and the various components of the flight display unit 102b, any computing device described herein can be configured to perform process 600.

In step 602, the network switch 406 of the flight display unit 102b can receive avionics data via a physical interface, the PHY 426 and/or the PHY 428. In step 604, the ingress circuit 420 of the network switch 406 can be configured to rate limit the received avionics data. Rate limiting the received avionics data may include checking, at a first period, any received avionics data to make sure that the rate at which avionics is received does not exceed a predetermined rate (e.g., 25 Mbps). In response to determining that the rate at which data is received exceeds the predetermined rate, the ingress circuit 420 can discard some of the received avionics data in order to meet the predetermined rate.

In step 606, the network switch 406 can be configured to determine the destination for the received avionics data. In some embodiments, the network switch 406 can use an address (e.g., a media access controller (MAC) address, a port number, etc.) and/or any other identifier included in the avionics data to determine the destination for the received avionics data. In response to determining that the destination for the received avionics data is the flight display unit 102b itself, the flight display unit 102b can perform step 608 in process 600. However, in response to determining that the avionics data is destined for a different device, the flight display unit 102b can perform steps 610-612 of process 600.

The flight display unit 102b can perform step 608 in response to determining, in step 606, that the received avionics data of step 602 is destined for the flight display unit 102b. In step 608, the network switch 406 can provide the processing circuit 404 of the flight display circuit 403 with the received avionics data. The processing circuit 404, specifically the touch screen controller 414, can store the avionics data, use the avionics data to display information to a pilot via the user interface 402, and/or perform any other function of the flight display unit 102b.

In steps 610-612, the flight display unit 102b can perform egress rate limiting of the avionics data and send the avionics data to another device. The egress circuit 424 of the network switch 406 can perform the egress rate limiting. By performing the egress rate limiting, the egress circuit 424 can perform traffic shaping that maintains a predetermined transmission rate (e.g., 25 Mbps). The egress circuit 424 can periodically check the transmission rate of transmitted data. The network switch 406 can send the rate limited avionics data to another device (e.g., the flight display unit 102c) via a physical interface of the flight display unit 102b (e.g., the PHY 428). In some embodiments, the physical interface by which the avionics data is sent is not the physical interface by which the avionics data was received. For example, if the flight display unit 102b receives avionics data via the PHY 426, the data may be sent via the PHY 428. Similarly, if the flight display unit 102b receives avionics data via the PHY 428, the flight display unit 102b may send the avionics data via the PHY 426.

Figure 7:
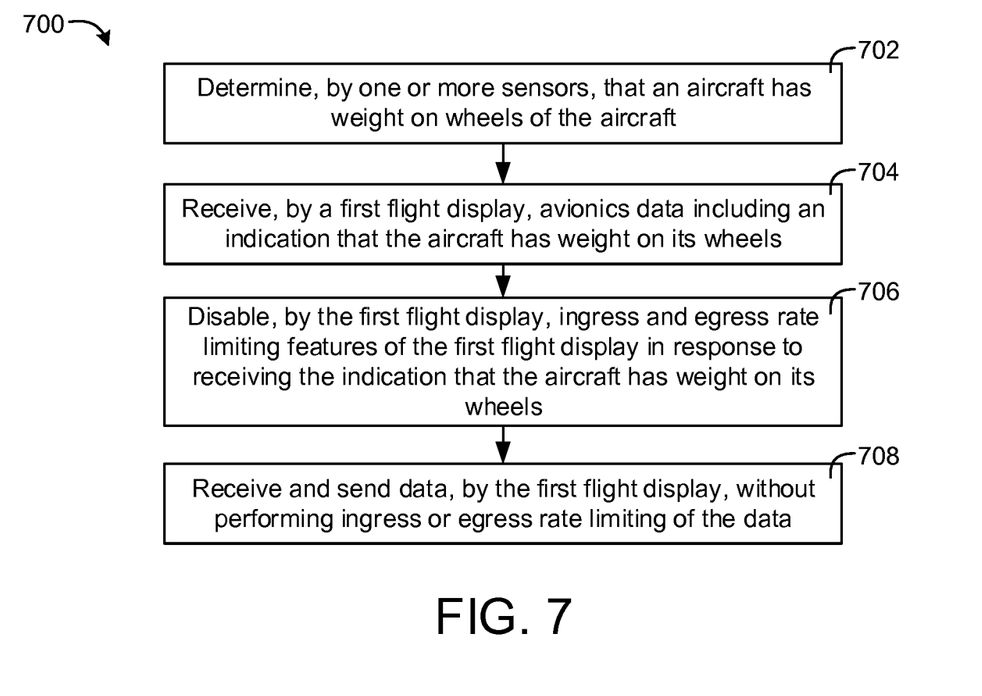
FIG. 7 is a flow diagram of a process that can be performed by the flight display units of FIG. 1 for disabling egress and ingress rate limiting according to an exemplary aspect of the inventive concepts disclosed herein.

Referring now to FIG. 7, a process 700 that can be performed by one of the flight display units of FIG. 3A is shown, according to an exemplary embodiment. The flight display unit 102b can be configured to perform process 700. The process 700 is described with reference to a first flight display unit, the flight display unit 102b. Although FIG. 7 and process 700 are described with reference to the flight display unit 102b and the various components of the flight display unit 102b, any computing device described herein can be configured to perform process 700. The avionics units 104a-d, the flight display unit 102a, the flight display unit 102c, and/or the flight display units 102d-f can be configured to perform process 600.

In step 702, one or more sensors of an aircraft can be configured to determine that the aircraft has weight on its wheels (WOW) (e.g., the wheel sensor 306), the aircraft is not airborne. These sensors may be part of, connected to, or otherwise in communication with an avionics unit (e.g., the avionics unit 104a). The avionics system that determines that the aircraft has weight on its wheels may send avionics data that includes an indication that the aircraft has weight on its wheels to all of the devices of the flight display network 302 and/or the flight display network 304.

In step 704, the flight display unit 102b can receive the avionics data that indicates that the aircraft has weight on its wheels. In response to receiving this indication, the data load circuit 416 can disable any egress or ingress rate limiting performed by the network switch 406, i.e., the data load circuit 416 can disable the egress circuit 424 and the ingress circuit 420 (step 706). Disabling egress and/or ingress rate limiting may allow for the flight display unit 102b to operate without discarding any avionics data or otherwise maintaining a predetermined transmission and receiving rate.

In step 708, the flight display unit 102b can receive and send data without performing ingress or egress rate limiting. This may allow for data loading (e.g., firmware updates, loading large quantities of data from an external source, etc.) to be performed outside of the rate limits that exist with egress and ingress rate limiting enabled. For example, with egress and ingress rate limiting disabled, the flight display unit 102b can perform process 600 without steps 604 and 610.

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. A flight display system for an aircraft, the flight display system comprising:
    a plurality of touch-screen units configured to communicate with each other in a daisy chain network, wherein each of the plurality of touch-screen units comprises a physical network interface configured to communicate with one of the plurality of flight display units, another physical network interface configured to communicate with another of the plurality of touch-screen units, and a circuit, wherein a first touch-screen unit of the plurality of touch-screen units is configured to:
    receive avionics data via a first physical network interface of the first touch-screen unit, the avionics data comprising user input received via at least one of the plurality of touch-screen units;
    determine whether the avionics data is destined for the first touch-screen unit;
    send the avionics data to a second touch-screen unit of the plurality of touch-screen units via a second physical network interface of the first touch-screen unit in response to determining that the avionics data is not destined for the first touch-screen unit;
    perform ingress rate limiting by rate limiting the avionics data at a first predefined interval to meet a first data rate, wherein rate limiting the avionics data comprises discarding a portion of the avionics data;
    receive an indication that the aircraft is on ground; and
    disable the ingress rate limiting in response to determining that the aircraft is on the ground.

2. The flight display system of claim 1, wherein the indication that the aircraft is on the ground is a weight on wheels signal.

3. The flight display system of claim 1, further comprising a user selector that provides a signal that disables the rate limiting.

4. The flight display system of claim 1, wherein the circuit of each of the plurality of touch-screen units is configured to perform egress rate limiting by sending the avionics data at a second data rate.

5. The flight display system of claim 4, wherein the circuit of each of the plurality of touch-screen units is configured to:
    receive the indication that the aircraft is on the ground; and
    disable the egress rate limiting in response to determining that the aircraft is on the ground.

6. The flight display system of claim 1, wherein the plurality of touch-screen units are located on a left side of a cockpit; and
    wherein the flight display system further comprises a second plurality of touch-screen units configured to communicate via a second daisy chain network, wherein the second plurality of touch-screen units are located on a right side of the cockpit.

7. The flight display system of claim 1, wherein each of the plurality of touch-screen units comprises a touch screen display, wherein the circuit of each of the plurality of touch-screen units is configured to cause the touch screen display to display information to a pilot based on the avionics data.

8. The flight display system of claim 1, wherein the first touch-screen unit is connected to a first avionics unit via the first physical network interface of the first touch-screen unit, wherein the first touch-screen unit of the plurality of flight display units receives the avionics data from the first avionics unit;
    wherein a second flight display unit is connected to a second avionics unit via a particular second physical interface of the second touch-screen unit, wherein the second touch-screen unit is configured to receive second avionics data via the second avionics unit.

9. The flight display system of claim 1, wherein the flight display system further comprises one or more sensors configured to determine whether the aircraft has weight on wheels of the aircraft, wherein the avionics data comprises an indication of whether the aircraft has weight on the wheels of the aircraft; and
    wherein the circuit of each of the plurality of touch-screen units is configured to disable ingress and egress rate limiting of the avionics data in response to determining that the avionics data indicates that the aircraft has weight on the wheels of the aircraft.

10. A method for a fault tolerant flight display system for a cockpit of an aircraft, the method comprising:
    receiving, by a first touch-screen unit of a plurality of touch-screen units, avionics data via a first physical network interface of the first touch-screen unit, wherein the plurality of touch-screen units are configured to communicate with each other in a daisy chain network, the avionics data comprising user input received via one of the plurality of touch-screen units;
    performing, by the first touch-screen unit, ingress rate limiting by rate limiting the avionics data at a first predefined interval to meet a first data rate, wherein rate limiting the avionics data comprises discarding a portion of the avionics data;
    determining, by the first touch-screen unit, whether the avionics data is destined for the first touch-screen unit;
    sending, by the first touch-screen unit, the avionics data to a second touch-screen unit of the plurality of the touch-screen units via a second physical network interface of the first touch-screen unit in response to determining that the avionics data is not destined for the first touch-screen unit;
    receiving, by the first touch-screen unit, an indication that the aircraft is on ground; and
    disabling, by the first touch-screen unit, the ingress rate limiting in response to determining that the aircraft is on the ground.

11. The method of claim 10, further comprising:
    receiving a signal provided by user selection that disables the rate limiting, by the first touch-screen unit, the indication that the aircraft is on the ground; and
    disabling, by the first touch-screen unit, the ingress rate limiting in response to determining that the aircraft is on the ground.

12. The method of claim 10, further comprising performing egress rate limiting by sending the avionics data at a second data rate.

13. The method of claim 12, further comprising:
receiving, by the first touch-screen unit, the indication that the aircraft is on the ground; and
disabling, by the one of the plurality of touch-screen units, the egress rate limiting in response to determining that the aircraft is on the ground.

14. The method of claim 10, further comprising causing, by the first touch-screen unit, a touch screen display to display information to a pilot based on the avionics data, wherein each of the plurality of touch-screen units comprises a particular touch screen display.

15. The method of claim 10, further comprising:
receiving, by the first touch-screen unit of the plurality of flight display units, the avionics data from a first avionics unit, wherein the first touch-screen unit is connected to the first avionics unit via the first physical network interface of the first touch-screen unit; and
receiving, by the second touch-screen unit, second avionics data from a second avionics unit, wherein the second touch-screen unit is connected to the second avionics unit via a second physical interface of the second touch-screen unit.

16. A fault tolerant flight display system for a cockpit of an aircraft, the fault tolerant flight display system comprising:
a plurality of touch-screen units configured to communicate with each other in a daisy chain network, wherein each of the plurality of touch-screen units comprises a physical network interface configured to communicate with one of the plurality of touch-screen units, another physical network interface configured to communicate with another of the plurality of touch-screen units, and a circuit, wherein a first touch-screen unit of the plurality of touch-screen units is configured to:
receive avionics data via a first physical network interface of the first touch-screen unit, the avionics data comprising user input received via one of the plurality of touch-screen units;
perform ingress rate limiting by rate limit the avionics data at a first predefined interval to meet a first data rate, wherein rate limiting the avionics data comprises discarding a portion of the avionics data;
determine whether the avionics data is destined for the first touch-screen unit;
send the avionics data to a second touch-screen unit of the plurality of touch-screen units via a second physical network interface of the first touch-screen unit in response to determining that the avionics data is not destined for the first touch-screen unit, wherein sending the avionics data to the second touch-screen comprises sending the avionics data at a second data rate;
receive an indication that the aircraft is on ground;
disable the ingress rate limiting in response to determining that the aircraft is on the ground.

17. The fault tolerant flight display system of claim 16, wherein the first touch-screen unit is configured to:
receive the indication that the aircraft is on the ground;
disable the ingress rate limiting in response to determining that the aircraft is on the ground; and
disable egress rate limiting in response to determining that the aircraft is on the ground.

18. The fault tolerant flight display system of claim 16, wherein the plurality of touch-screen units are located on a left side of the cockpit; and
wherein the fault tolerant flight display system further comprises a second plurality of touch-screen units configured to communicate via a second daisy chain network, wherein the second plurality of touch-screen units are located on a right side of the cockpit.

19. The fault tolerant flight display system of claim 16, wherein each of the plurality of touch-screen units comprises a touch screen display, wherein the circuit of each of the plurality of flight display units is configured to cause the touch screen display to display information to a pilot based on the avionics data.

20. The fault tolerant flight display system of claim 16, wherein the first touch-screen unit is connected to a first avionics unit via the first physical network interface of the first touch-screen unit, wherein the first touch-screen unit receives the avionics data from the first avionics unit;
wherein the second touch-screen unit is connected to a second avionics unit via a particular second physical interface of the second touch-screen unit, wherein the second touch-screen unit is configured to receive second avionics data via the second avionics unit.

* * * * *